US012597260B1

(12) United States Patent
Rhodes et al.

(10) Patent No.: US 12,597,260 B1
(45) Date of Patent: Apr. 7, 2026

(54) SYSTEMS AND METHODS FOR MONITORING AN ENCLOSURE

(71) Applicant: CNKTD Technologies LLC, Westlake Village, CA (US)

(72) Inventors: Brian George Rhodes, Minneapolis, MN (US); Ryan Thomas Herbison, Eau Claire, WI (US); Terry Doran Mallberg, Saint Paul, MN (US)

(73) Assignee: CNKTD Technologies LLC, Westlake Village, CA (US)

( * ) Notice: Subject to any disclaimer, the term of this patent is extended or adjusted under 35 U.S.C. 154(b) by 0 days.

(21) Appl. No.: 19/060,682

(22) Filed: Feb. 22, 2025

(51) Int. Cl.
| | |
|---|---|
| *G06V 20/52* | (2022.01) |
| *G06T 7/20* | (2017.01) |
| *G06T 7/521* | (2017.01) |
| *G06T 7/593* | (2017.01) |
| *G06T 7/62* | (2017.01) |
| *G06V 10/60* | (2022.01) |
| *G06V 20/59* | (2022.01) |

(52) U.S. Cl.
CPC ............... *G06V 20/52* (2022.01); *G06T 7/20* (2013.01); *G06T 7/521* (2017.01); *G06T 7/593* (2017.01); *G06T 7/62* (2017.01); *G06V 10/60* (2022.01); *G06V 20/59* (2022.01); *G06V 2201/07* (2022.01)

(58) Field of Classification Search
CPC ............................... G06V 20/52; G06V 20/59
See application file for complete search history.

(56) References Cited

U.S. PATENT DOCUMENTS

| | | | |
|---|---|---|---|
| 7,427,918 B2 | 9/2008 | Fano | |
| 8,115,620 B2 | 2/2012 | Breed | |
| 8,354,927 B2 | 1/2013 | Breed | |
| 9,886,799 B2 | 2/2018 | Kwak | |
| 11,195,260 B1 | 12/2021 | Walstrom et al. | |
| 11,270,348 B2 | 3/2022 | Walden et al. | |
| 11,798,142 B2 | 10/2023 | Walstom et al. | |
| 2002/0097439 A1* | 7/2002 | Braica ................. | H04N 1/4092 |
| | | | 382/274 |
| 2004/0140886 A1 | 7/2004 | Cleveland et al. | |
| 2007/0075853 A1 | 4/2007 | Griffin et al. | |
| 2008/0068185 A1* | 3/2008 | Bonefas ................ | G06V 40/20 |
| | | | 340/575 |

(Continued)

OTHER PUBLICATIONS

"High-Value Cargo Monitoring" (available at https://sirixmonitoring.com/high-value-cargo-monitoring/).

*Primary Examiner* — Jayanti K Patel
*Assistant Examiner* — Christopher Kingsbury Glover
(74) *Attorney, Agent, or Firm* — Venable LLP

(57) ABSTRACT

Systems and methods are provided for monitoring an enclosure that is transported by a vehicle. The system may include a mmWave device configured to direct mmWave signals into the enclosure, at least one camera configured to capture an image of the enclosure, and a lighting device configured to direct light into the enclosure when the at least camera captures the image of the enclosure. The system may further include at least one processor configured to read out and execute instructions stored in at least one memory to perform a monitoring operation wherein the processor controls the mmWave device, the camera, and the lighting device.

18 Claims, 9 Drawing Sheets
(2 of 9 Drawing Sheet(s) Filed in Color)

(56) References Cited

U.S. PATENT DOCUMENTS

| | | | |
|---|---|---|---|
| 2012/0252488 | A1 | 10/2012 | Hartmann et al. |
| 2014/0036072 | A1 | 2/2014 | Lyall et al. |
| 2019/0207713 | A1* | 7/2019 | Lomayev .............. H04L 1/0643 |
| 2019/0316403 | A1 | 10/2019 | Aiello |
| 2019/0333233 | A1* | 10/2019 | Hu .......................... G01S 13/04 |
| 2020/0031284 | A1 | 1/2020 | Onica |
| 2021/0358157 | A1* | 11/2021 | Ohnishi ............... H04N 13/239 |
| 2021/0376493 | A1* | 12/2021 | Shah ........................ H01Q 1/38 |
| 2021/0406566 | A1 | 12/2021 | Shankar |
| 2023/0124662 | A1* | 4/2023 | Agarwala .............. G06V 20/52 |
| | | | 382/103 |
| 2024/0257519 | A1* | 8/2024 | Zhang .................. G06V 10/147 |
| 2024/0406353 | A1* | 12/2024 | Mouridsen ............. H04N 7/188 |
| 2025/0029260 | A1* | 1/2025 | Udupa ................... G06V 10/25 |

* cited by examiner

910 — Illuminate and Stereo Image

920 — Avg. Pixel > Threshold   No

Yes

930 — Rectify and Undistort Images

900

940 — Create Disparity Map

950 — Create and Transform Depth Map

960 — Average Depth > Threshold   No   970   Avg. Pixels in Rectangle

Yes

980 — Calculate Occupancy Estimate

SYSTEMS AND METHODS FOR MONITORING AN ENCLOSURE

FIELD OF THE DISCLOSURE

The present disclosure relates to systems and methods for monitoring an enclosure. In particular embodiments, the present disclosure relates to systems and methods for monitoring the interior of a vehicle-transported enclosure containing cargo.

BACKGROUND

Trucking and shipping cargo are a vital part of the global economy, ensuring that goods reach businesses, retailers, and consumers efficiently and on time. From essential supplies like food, medicine, and fuel to raw materials for manufacturing, the transportation industry keeps commerce moving. Without a reliable trucking and shipping network, supply chains would break down, leading to shortages, delays, and economic instability. Additionally, the industry supports millions of jobs, from truck drivers and logistics coordinators to warehouse workers and mechanics. As technology advances, innovations in logistics continue to improve efficiency and sustainability in the movement of goods worldwide.

Monitoring the cargo of a shipping truck presents several challenges, ranging from technical limitations to ethical concerns. One issue is the power consumption of camera-based monitoring systems. The operation of camera systems requires a significant power supply. Since trailers sometimes operate independently from the truck's main electrical system, maintaining a consistent power source for cameras, sensors, and data transmission equipment can be difficult.

Another challenge in monitoring cargo is a lack of lighting inside a trailer. Many trailers are not equipped with built-in lighting systems, which makes it difficult for cameras to capture clear images, especially during nighttime operations or in dimly lit warehouses. Installing additional lighting would increase energy consumption and may not always be practical, particularly in trailers that are frequently loaded and unloaded in different environments. Poor lighting can lead to inaccurate monitoring, missed inventory, or difficulties in identifying tampering or damage to goods.

Privacy concerns also pose a significant issue for camera monitoring systems. Many workers may feel uncomfortable or even resist working under constant surveillance, as it raises concerns about micromanagement and potential misuse of recorded footage. Monitoring systems that capture pictures or video of employees while they load and unload cargo could lead to legal and ethical issues, particularly regarding consent and data security.

SUMMARY OF THE DISCLOSURE

According to an aspect, a system for monitoring an enclosure that is transported by a vehicle is provided. The system includes a mmWave device configured to direct mmWave signals into the enclosure and receive mmWave signals reflected back to the mmWave device and at least one camera configured to capture an image of an interior of the enclosure. At least one processor is configured to read out and execute instructions stored in at least one memory to perform a monitoring operation wherein the at least one processor (i) processes the mmWave signals that are reflected back and received by the mmWave device to determine if there is a moving object in the interior of the enclosure and (ii) directs the at least one camera to capture the image of the interior of the enclosure when it is determined that there is no moving object in the interior of the enclosure.

According to another aspect, a system for monitoring an enclosed space that is transported by a vehicle is provided, with the system being mountable in an interior of the enclosure. The system includes cameras configured to capture stereo images of the interior of the enclosure and a structured light device configured to project structured light into the interior of the enclosure. At least one processor is configured to read out and execute instructions stored in at least one memory to perform a monitoring operation wherein the at least one processor directs the cameras to capture the stereo images of the interior of the enclosure while the structured light device projects the structured light into the interior of the enclosure.

According to another aspect, a system is provided for monitoring an enclosed space. The system includes a mmWave device configured to direct mmWave signals into the enclosed space, at least one camera configured to capture an image of the enclosed space, and a lighting device configured to project light into the enclosed space when the at least one camera captures the image of the enclosed space. At least one processor configured to read out and execute instructions stored in at least one memory to perform a monitoring operation wherein the processor controls the mmWave device, the camera, and the lighting device.

According to another aspect, a system is provided for monitoring an enclosed space. The system includes a mmWave device configured to direct mmWave signals into the enclosed space, at least one camera configured to capture an image of the enclosed space, and a lighting device configured to project light into the enclosed space when the at least one camera captures the image of the enclosed space. At least one processor is configured to read out and execute instructions stored in at least one memory to perform a monitoring operation wherein the processor controls the mmWave device, the camera, and the lighting device.

Additional features and advantages of the disclosure will be set forth in the description that follows, and in part will be understood from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

BRIEF DESCRIPTION OF THE DRAWINGS

This patent or application file contains at least one drawing executed in color. Copies of this patent or patent application publication with color drawing(s) will be provided by the Office upon request and payment of the necessary fee.

It should be noted that to facilitate understanding of the disclosure, in some instances the drawings may not be to actual scale and the dimensions and orientations of some components may be exaggerated.

DETAILED DESCRIPTION

Various embodiments of the disclosure are described in detail below. While specific implementations are described, this is done for illustration purposes only. Other components and configurations may be used without parting from the spirit and scope of the disclosure.

Embodiments of the present disclosure relate to systems and methods for monitoring an enclosed space. In some embodiments, systems and methods are provided for monitoring and an enclosure that is used for the transportation or storage of cargo. Some examples of such an enclosure are trailers that include wheels, containers that do not include wheels and are carried by a vehicle, and the cargo-carrying space of box trucks. In other examples, the enclosure may be a stationary structure not being transported by vehicle. In many of the descriptions that follow, embodiments of systems and methods are disclosed in the context of monitoring a trailer with wheels that is pulled by a vehicle. However, the scope of the present disclosure is not limited to monitoring such a trailer, as the systems and methods may be used to monitor other types of enclosures that are used for the transportation or storage of cargo. In still further embodiments, the systems and methods could be adapted for monitoring other enclosed spaces, such as monitoring a room in a building.

Figure 1:
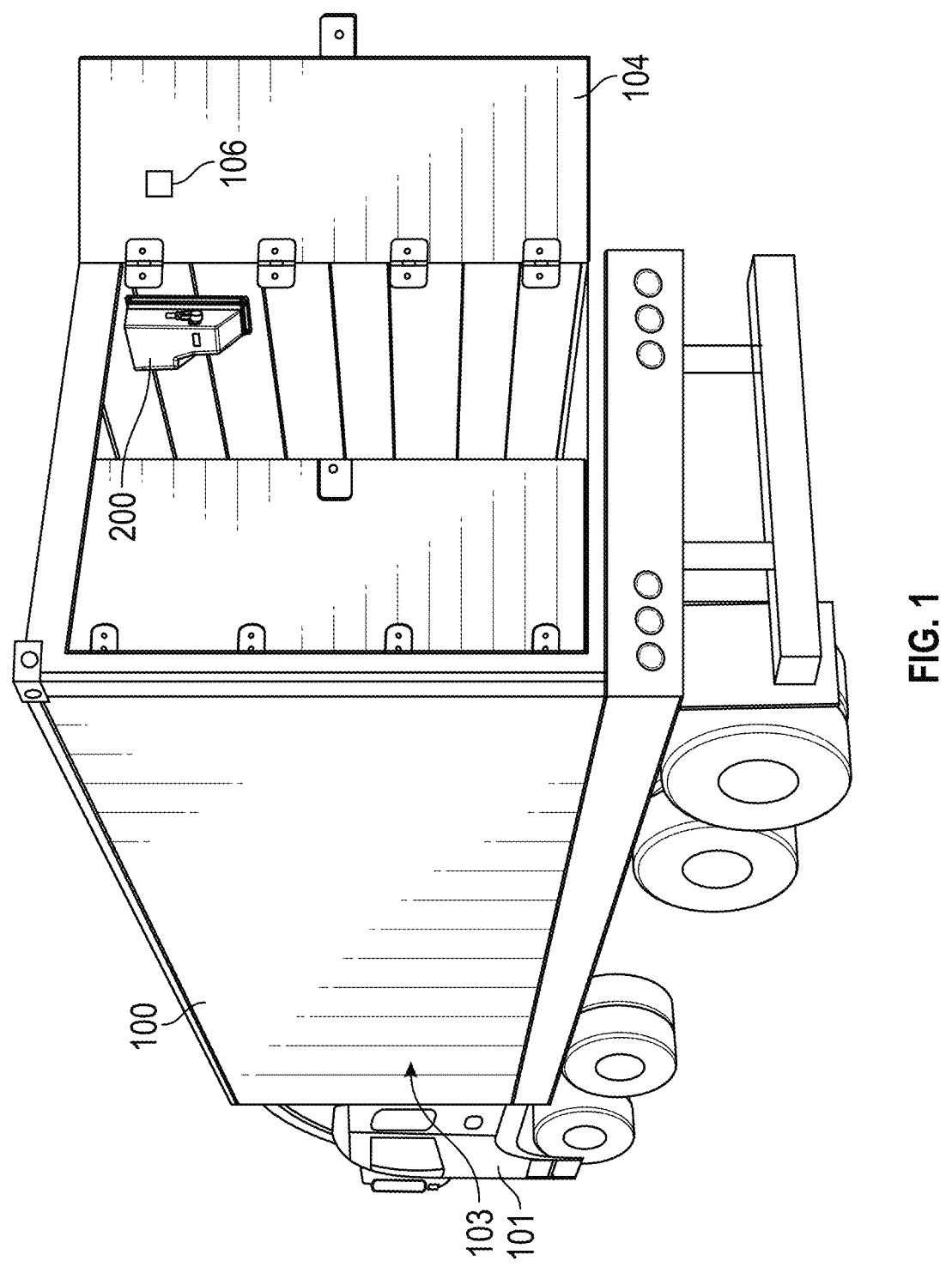
FIG. 1 illustrates a trailer provided with a monitoring system according to an embodiment of the present disclosure.

FIG. 1 shows a trailer 100 pulled by a semi-truck 101. A door 104 of the trailer 100 is open, and a monitoring system 200 according to an embodiment of the present disclosure can be seen inside the trailer 100. The monitoring system 200 is positioned at an upper part of one of the sidewalls of the trailer 100 such that sensor and lighting components (described below) of the monitoring system 200 are directed towards the nose 103 of the trailer 100. The monitoring system 200 is positioned in the vicinity of a magnet 106 that is mounted on the door 104. As will be discussed below, the monitoring system 200 includes a magnetometer configured to detect a position and direction of a magnetic field emanating from the magnet 106, which thereby allows the monitoring system 200 to determine when the door 104 is opened and closed. The door status determined by the monitoring system 200 can be used in conjunction with further steps of a monitoring operation, as will be described below. Also, the door status may be provided to the semi-truck 101 to allow the driver to know whether the door is open or closed.

Although not depicted in FIG. 1, antenna(s) and solar panel are mounted to the roof of the trailer 100. The antenna(s) is operatively connected to the monitoring system 200 and provides a communication portal for sending data, instructions, etc., to and from the monitoring system 200. Such communication will be further described below. The solar panel can provide power to the monitoring system 200. The antenna(s) and solar panel may be provided as separate structures mounted to the trailer 100 or may be integrated into a singular structure that is mounted to the trailer 100. Further, the antenna(s) and/or solar panel could be mounted to the sides of the trailer 100 instead of the roof of the trailer 100. It should be noted that, in many embodiments, the monitoring system 200 is provided with power from sources other than the solar panel, such as from a battery that is provided with the monitoring system 200 or from a battery of the semi-truck 101.

The antenna(s) provide one or more communication protocols, such as cellular (e.g., 4G, 5G), WiFi, GNSS (e.g., GPS, Galileo, GLONASS), BLUETOOTH® (e.g., BLU-ETOOTH® low energy (BLE)), satellite communications, or V2X (Vehicle-to-Everything). Each antenna may include multiple antenna elements, each optimized for specific frequency bands to ensure high-performance signal transmission and reception. The antenna(s) is operatively connected to the monitoring system 200 such that the monitoring system 200 can receive and transmit data or other information using the antenna(s). For example, when conducting the monitoring operations described below, the monitoring system 200 may capture an image of the inside of the trailer 100 and then transmit the image to another location using the antennas.

Embodiments of the present disclosure are not limited to the specific positioning of components as depicted in FIG. 1. That is, while the monitoring system 200 is depicted on the upper left side wall of the trailer 100, in other embodiments the monitoring system 200 may be positioned on the right-side wall of the trailer 100, and in still other embodiments, the monitoring system 200 is positioned on the ceiling of the trailer 100. When providing the monitoring system 200 in other positions, the corresponding magnet 106 is positioned in the vicinity of the monitoring system 200 as well. For example, in another embodiment, the monitoring system 200 is provided on the trailer door 104 and the magnet 106 is provided on a wall of the trailer 100.

Figure 2:
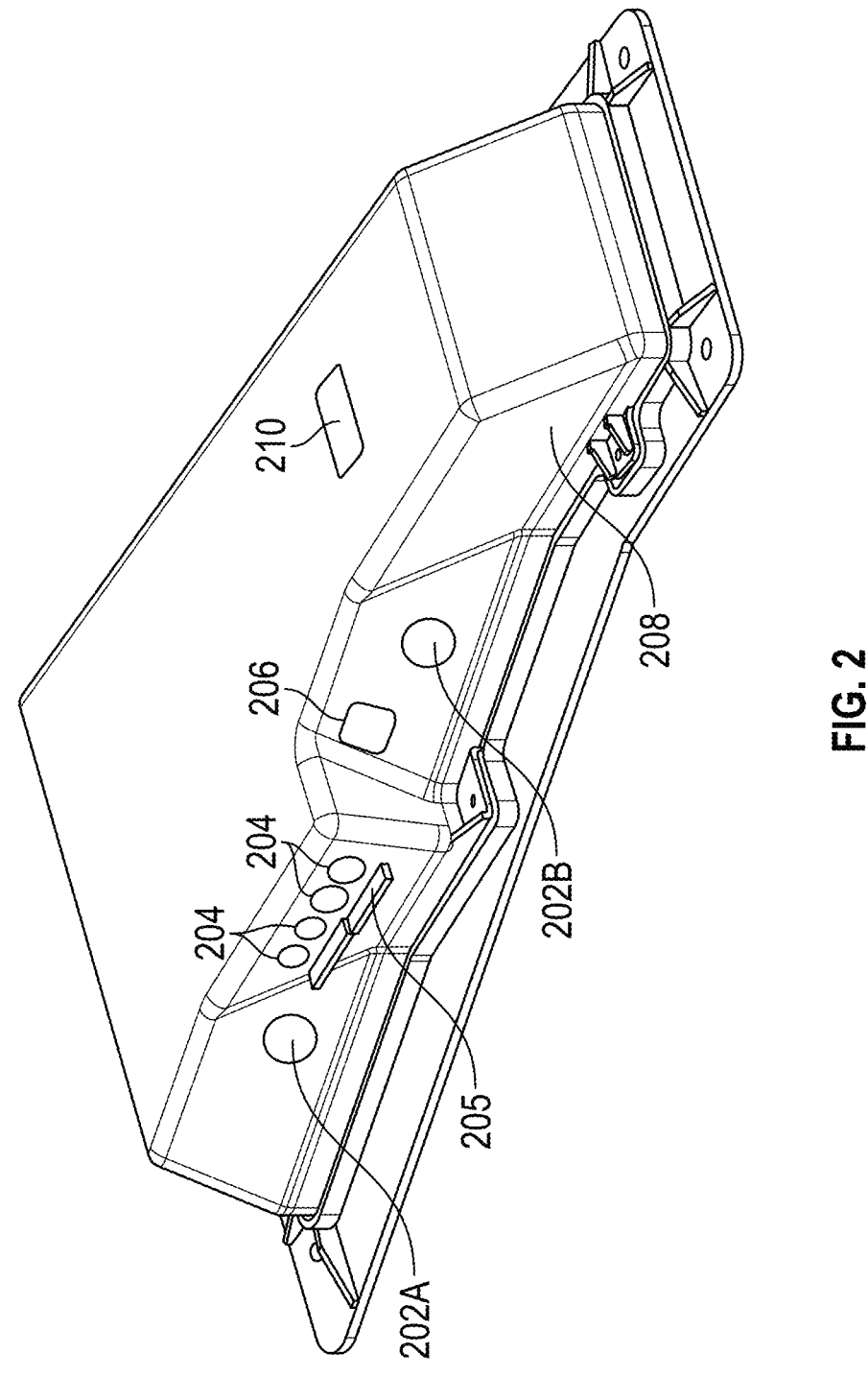
FIG. 2 illustrates a monitoring system according to an embodiment of the present disclosure.

FIG. 2 is a view of the monitoring system 200 embodied as a singular structure. The monitoring system 200 comprises sensor and lighting components, including first and second cameras 202A and 202B, flood lights 204, a structured light device 206, a mmWave device 208, and a further camera 210. Each of the components of the monitoring system 200 will be described below.

The monitoring system 200 also comprises hardware including a computing device having at least one processor that executes specialized instructions (e.g., software) to control the sensor and lighting components of the monitoring system 200. As will be described below, the hardware also processes data generated from operation of the sensor and lighting components as part of the monitoring operations and conducts other functions.

It should be noted that while FIG. 2 depicts an embodiment wherein the sensor, lighting, and other components of the monitoring system 200 are provided in a singular structure, the present disclosure is not limited to such a form. That is, in other embodiments the monitoring system may be provided as separate structures that are operatively connected. For example, the monitoring system could be configured such that the mmWave device, stereo cameras, and the structured light device are separate from each other and are connected, e.g., though a network connection, to a separate computing device including a processor.

Figure 3:
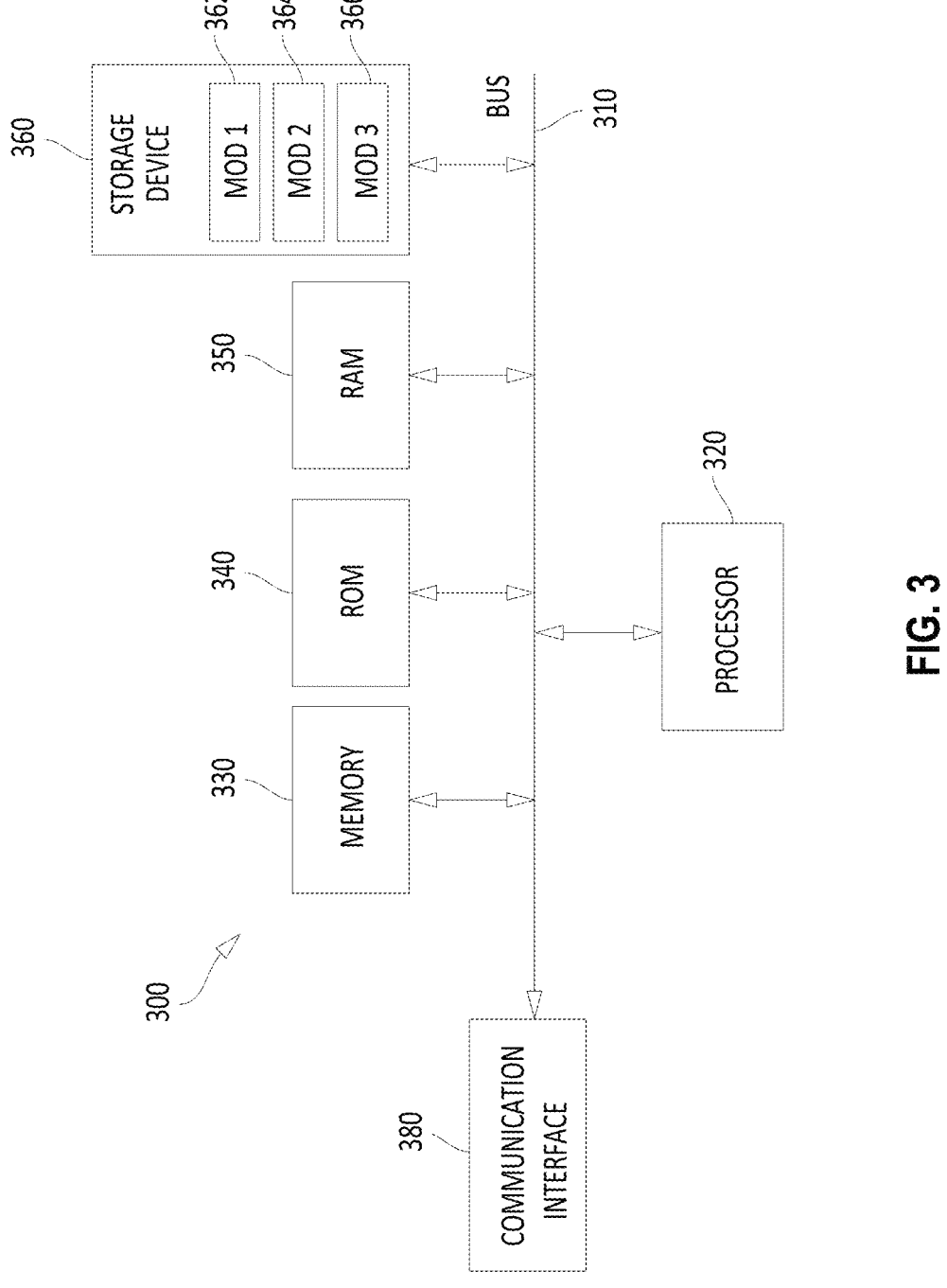
FIG. 3 illustrates an example of a computing device that may be included with the monitoring system according to an embodiment of the present disclosure.

In embodiments of the present disclosure, the processing/controlling hardware is in the form of a computing device, an example of which is schematically depicted in FIG. 3. The computing device 300 may include a processor (e.g, a central processing unit (CPU)) 320 and a system bus 310 that couples various other components including the memory 330 such as read-only memory (ROM) 340 and random-access memory (RAM) 350 to the processor 320. The computing device 300 can include a cache of high-speed memory connected directly with, in close proximity to, or integrated as part of the processor 320. The computing device 300 copies data from the system memory 330 and/or the storage device 360 to the cache for quick access by the processor 320. In this way, the cache provides a performance boost that avoids processor 320 delays while waiting for data. These and other modules can control or be configured to control the processor 320 to perform various functions, such as those described below. Other system memory may be available for use as well. The system memory can include multiple different types of memory with different performance characteristics.

Although the computing device 300 depicted in FIG. 3 includes one processor 320, it will be appreciated by those skilled in the art that more than one processor may be used in the computing device 300. For example, although not depicted, the computing device may include a graphics processing unit (GPU), a neural processing unit (NPU), digital signal processor (DSP), or a field-programmable gate array (FGPA) in addition to the processor 320. A GPU is a specialized processor designed to handle parallel computations, making it particularly effective for rendering graphics, processing large datasets, and accelerating complex computations. In embodiments, the GPU works in conjunction with the processor 320 (functioning as a CPU) by offloading highly parallel tasks, such as image processing, while the CPU manages overall system operations, sequential processing, and task coordination. The CPU directs high-level instructions to the GPU, which then executes massive numbers of smaller calculations simultaneously, significantly improving performance. This collaboration allows for optimized efficiency, with the CPU handling logic-heavy tasks and the GPU handling compute-intensive parallel workloads.

The processor 320 can include any general-purpose processor for executing software modules, such as module 362, module 364, and module 366 stored in the storage device 360. The modules 362, 364, and 366 may be instructions that the processor 320 reads out and executes to cause the processor to operatively control the components of the monitoring device 100 and perform the monitoring and other functions described herein. The processor 320 may essentially be a completely self-contained computing system, containing multiple cores or processors, a bus, memory controller, cache, etc. A multi-core processor may be symmetric or asymmetric.

The system bus 310 may be any of several types of bus structures including a memory bus or memory controller, a peripheral bus, and a local bus using any of a variety of bus architectures. The computing device 100 further includes storage devices 360 such as a hard disk drive. The storage device 360 can include software modules 362, 364, 366 for instructing the processor 320 to perform the functions of the monitoring system according to embodiments of the present disclosure. Other hardware or software modules are contemplated. The storage device 360 is connected to the system bus 310 by a bus interface. The storage devices and the associated computer-readable storage media provide nonvolatile storage of computer-readable instructions, data structures, program modules and other data for the computing device 300. In one aspect, a hardware module that performs a particular function includes the software component stored in a tangible computer-readable storage medium in connection with the necessary hardware components, such as the processor 320, system bus 310, and so forth, to carry out the function. In another aspect, the system can use a processor and computer-readable storage medium to store instructions which, when executed by a processor (e.g., one or more processors), cause the processor to perform methods or other specific actions as described herein.

Embodiments of the present disclosure employ the storage device 360 in the form of a hard disk or other types of computer-readable media which can store data that are accessible by a computer, such as RAMs and ROMs. Tangible computer-readable storage media, computer-readable storage devices, or computer-readable memory devices, expressly exclude media such as transitory waves, energy, carrier signals, electromagnetic waves, and signals per se.

The communications interface 380 allows for input and output to and from the computing device 300. That is, the communications interface 380 operatively connects the computing device 100 to the monitoring system's sensor and lighting components such that the computing device 300 can control the sensor and lighting components and receive data from the sensor components. The communications interface also operatively connects the computing device to the aforementioned antenna(s) mounted on the trailer 100 so that the computing device 300 can send and receive data, such as through cellular, satellite, or Wi-Fi channels provided by the antenna(s). Those skilled in the art will easily recognize the means for implementing the communication interface 380.

Those skilled in the art will also recognize that there is no particular restriction on a hardware arrangement of a computing device as generally described herein and therefore the basic features may easily be substituted with alternative hardware or firmware arrangements. Thus, the present disclosure is not limited to the specific computing device 300 configuration depicted in FIG. 3.

In the following descriptions, hardware and functioning of the computing device 300 may be generally referred to as a "processor," "at least one processor" and/or "at least one processor executing instructions stored in at least one memory."

Referring again to FIG. 2, the first and second cameras 202A and 202B are configured to capture stereo images of the interior of the trailer 100. Stereo imaging involves simultaneously taking two images from slightly different perspectives, thereby simulating human binocular vision. The cameras 202A and 202B are positioned a fixed distance apart, known as the baseline, and this separation allows the cameras 202A and 202B to perceive depth. When an image is captured, objects at varying distances appear shifted between the left and right images, with closer objects exhibiting greater displacement than those farther away. This displacement, or disparity, allows for the computing of depth from the cameras 202A and 202B to objects in the trailer 100 and constructing a three-dimensional representation of the interior of the trailer 100.

To accurately determine depth from stereo images, stereo rectification is performed. This process involves aligning the images from the first and second cameras 202A and 202B so that corresponding points appear, for example, along the same horizontal and/or vertical scanline, i.e., epipolar rectification. This alignment simplifies the process of finding matches between the two images. Feature recognition methods such as one of scale-invariant feature transform (SIFT), features from accelerated segment test (FAST), oriented FAST and rotated BRIEF (ORB), and speeded up robust features (SURF) is then employed to detect distinct key points in both images. These techniques identify points of interest based on patterns of brightness, edges, and textures, ensuring robustness against variations in lighting and scale. Feature matching is subsequently applied to pair corresponding key points in the left and right images, thereby forming the basis for disparity computation.

A disparity map of the enclosure being monitored can be created by measuring the shift of corresponding points between the stereo images generated by the cameras 202A and 202B. In this regard, the epipolar lines are chosen to be most parallel to the line connecting the two cameras 202A and 202B. The disparity is then used to compute depth using the equation:

$$\text{Depth} = \frac{f \times B}{\text{Disparity}}$$

where f is the focal length of the cameras 202A and 202B, B is the baseline, i.e., the distance between the cameras 202A and 202B, and disparity is the pixel difference between corresponding points in the two images taken by the cameras 202A and 202B. The result is a depth map, where each pixel represents the distance of an object from the cameras. Techniques such as block matching or deep learning-based methods can be used to refine the disparity calculations to improve accuracy, particularly in handling occlusions and textureless regions that might be present inside a trailer 100 or other enclosure monitored by a system according to embodiments of the present disclosure.

To estimate the total volume of objects in the trailer 100, the depth map is processed to segment objects from the background using methods like thresholding, clustering, or machine learning-based segmentation. Once objects such as cargo in the trailer 100 are identified, their depth data is used to generate a 3D point cloud. Computational geometry techniques, including convex hulls, voxel grids, or mesh reconstruction, can then be applied to estimate the volume of each object.

From the depth calculations derived from stereo images taken by cameras 202A and 202B, the monitoring system 200 can calculate aspects of the cargo in the trailer 100 at the time the stereo images are taken. For example, the monitoring system 200 can calculate an occupancy estimate of the trailer 100 as the percentage of the interior of the trailer that is occupied. As another example, a floor space estimate as the percentage of the floor of the trailer that is occupied. Such calculations may be performed by the aforementioned at least one processor executing instructions in the aforementioned at least one memory. The monitoring system 200 can then transmit such calculations and/or the stereo images taken by the cameras 202A and 202B using its communications interface. In some embodiments, the calculations and/or image are sent to the antenna(s) of the trailer 100, which then transmits the calculations and/or image, for example, through a cellular network.

In some embodiments, the cameras 202A and 202B are configured to capture images in greyscale and not in color. Greyscale image processing requires less memory, and processing greyscale image can be performed faster, with a low-cost and lower power-consuming processor as compared to color image processing. Further, greyscale images are more easily transmitted, for example, using the antenna(s) operatively connected to the monitoring system. This is because greyscale images are smaller and compress more efficiently than color images, which means that greyscale images have a reduced payload size for transmission. Thus, less power is required to transmit the greyscale images by the antenna(s) through a network, and, further, network costs are reduced when transmitting the greyscale images.

The stereo cameras 202A and 202B may be configured for imaging standard-sized cargo enclosures (or another type of enclosure). For example, many cargo enclosures used with vehicles are 53 feet long or less. With a cargo enclosure sized as such, the stereo cameras 202A and 202B may have a resolution, field of view (FOV), and baseline distance between the cameras 202A and 202B that, in combination, result in a maximum 5% half-pixel error at about 52 feet from the lenses of the cameras 202A and 202B. In this regard, half-pixel error is used by a semi-global block matching disparity algorithm, as the algorithm does not use a full pixel error. A 1280×800 resolution may be used in embodiments, as such a resolution provides a good balance between processing time, memory (e.g., RAM), and payload transmission size requirements. The FOV may be 80 degrees horizontal and 55 degrees vertical, which strikes a balance between visibility of the measured space and accuracy. The baseline distance between the cameras 202A and 202B may be about 125 mm, as this baseline distance along with the other camera parameters may result in a worst-case half-pixel error of 3.9% with a minimum measurable distance (minZ) of 1.16 meters in the context of a standard-sized cargo enclosure.

Such camera configurations facilitates the imaging operations for the monitoring system 200 described herein for monitoring an enclosure such as the interior of a trailer 100. As will be appreciated by those skilled in the art, other stereo camera configurations may include more than two cameras or different types of cameras. For example, the cameras could be configured to take still images, video images, or both still and video images. As will also be appreciated by those skilled in the art, the first and second cameras 202A and 202B of the monitoring system 200 may be operatively controlled by the aforementioned at least one processor executing instructions in the at least one memory.

In embodiments of the present disclosure, stereo images of the interior of the trailer 100 or other type of enclosure that are captured by the first and second cameras 202A and 202B may be enhanced through further processing. Generally speaking, enclosures used for shipping cargo are dark environments because, in most cases, a lighting system is not provided throughout the interior of the enclosure. As a result, images taken by cameras, such as the first and second cameras 202A and 202B, may be dark. And depth information determined from dark stereo images may be inaccurate. There are known techniques for enhancing the brightness of images, such as a gamma increase that brightens midtones by applying a nonlinear adjustment to pixel values. Such techniques may be applied in embodiments of the present disclosure. However, when brightening stereo images of a dark space such as the interior of a trailer or other cargo enclosure, an across the board increase of pixel values may not provide sufficient enhancement because the stereo images may become saturated, thereby causing loss of information. Further, known image brightening techniques may result in little contrast between objects in the image, even when large contrast (alpha) values are applied.

In embodiments of the present disclosure, stereo images of an enclosure are enhanced for legibility using a series of steps. These steps include (i) determining an average intensity value of pixels of the stereo images, (ii) increasing intensity values of pixels that are above the average intensity value, (iii) decreasing intensity values of pixels that are below the average intensity value, and (iv) adjusting the gain and bias of all of the pixels. Increasing and decreasing the intensity values in steps (ii) and (iii) enhances contrast bi-directionally, thereby providing for better final stereo images. The resulting enhanced stereo images of an enclosure are provided with sufficient brightness and contrast such that objects in the stereo images can more easily be seen.

Figure 4C:
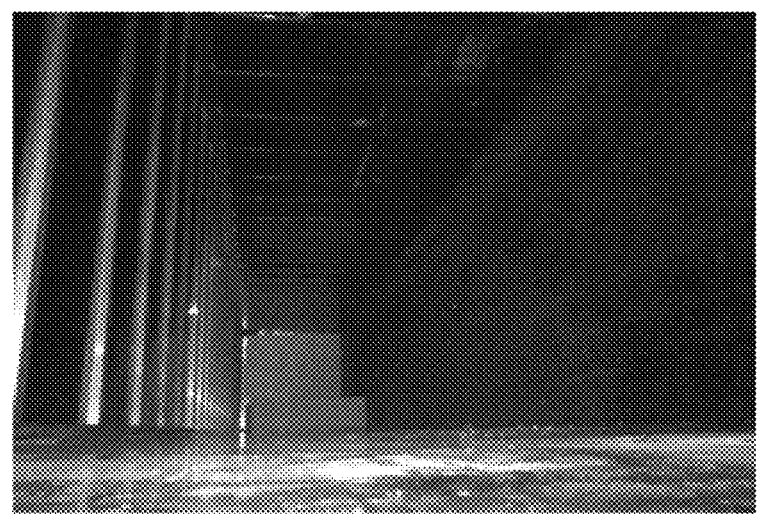
FIG. 4C is the image shown in FIG. 4A enhanced according to an embodiment of the present disclosure.
Figure 4B:
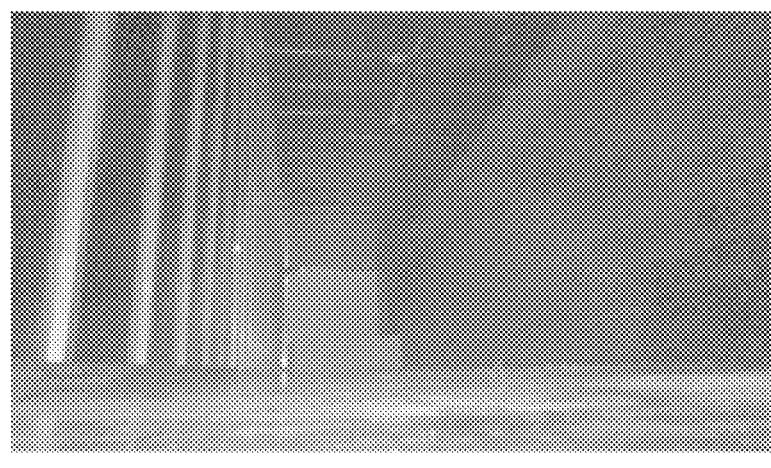
FIG. 4B is the image shown in FIG. 4A altered to increase brightness.
Figure 4A:
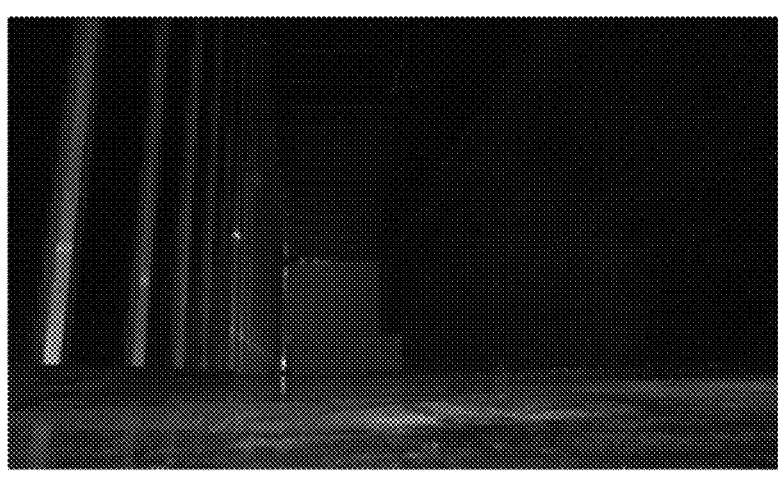
FIG. 4A is an image of the interior of a trailer.

FIGS. 4A, 4B, and 4C show examples of an image of the interior of a trailer before and after enhancement according to an embodiment of the present disclosure. FIG. 4A shows the interior of the trailer. In this case, the trailer's interior is lit with the flood lights of a monitoring system as described herein. A gamma increase was applied to the image in FIG. 4A, with the resulting image being shown in FIG. 4B. For comparison, the image in FIG. 4C was enhanced through the above-described process, including the steps of increasing intensity values of pixels that are above the average intensity value, decreasing intensity values of pixels that are below the average intensity value, and adjusting the gain and bias of all of the pixels. As is evident from a comparison of FIGS. 4A-4C, the image in FIG. 4C shows the most contrast such that the cargo positioned close to the nose of the trailer is visible. Thus, an accurate depth map may be calculated using an image as is shown in FIG. 4C (in conjunction with a second image).

As discussed above, a monitoring system 200 according to embodiments of the present disclosure may include a structured light projector 208, which is configured to project structured light onto the cargo in enclosure being monitored. As will be appreciated by those skilled in the art, structured lighting is a technique that projects a pattern onto a scene to help a camera system determine depth and surface geometry. When the pattern deforms upon hitting objects, stereo cameras can capture the distortions, and algorithms analyze the distortions to calculate the three-dimensional shape of the scene. When used with stereo imaging as in the present disclosure, structured light enhances depth perception by providing additional visual cues in the low-texture environment of an enclosure where natural light entering the enclosure and/or a standard lighting system provided with the enclosure are insufficient for the stereo imaging system to find correspondences between the two camera views. By combining structured light device 206 with the stereo cameras 202A and 202B, the monitoring system 200 according to the present disclosure can effectively normalize lighting in an enclosure to achieve more accurate calculations using the stereo images. Further, the power consumption of a structured light device 206 may be less than the power required for a standard illumination device that would be needed to provide sufficient light to the interior of the trailer 100 to allow for accurate stereo imaging.

In embodiments of the present disclosure, the structured light projector 206 is configured such that most or all of its field of illumination (FOI) is directed down the length of enclosure. For example, in the case of the trailer 100, the FOI from the structured lighting device 206 is directed towards the trailer's nose 103. With such an FOI, light incident on the sides of the trailer is minimized. Such a configuration is advantageous because sides of trailers or other types of enclosures are often highly reflective, and too much reflected light may have a deleterious effect on the images captured by the stereo cameras. To direct the structured light into such a FOI, a shroud or mask may be positioned adjacent to the light emitter of the structured light device 206. In other embodiments, the structured light device 206 may be configured such that the structured light itself is limited to being projected in the desired FOI.

In some examples, the structured light device 206 is in the form of a laser light system that generates coherent, collimated beams. The pattern projected by the structured light device is also not limited. For example, the pattern of the structured light device 206 may be dots that are randomly sized, randomly shaped, and randomly placed over most or all of the space of the enclosure. Such a pattern facilitates the stereo imaging of the contents of the trailer 100. As evident from this disclosure, the "pattern" of structured light is not limited to consistent, repeated shapes that are found in some structured light systems.

Figures 5A, 5B, 5C:
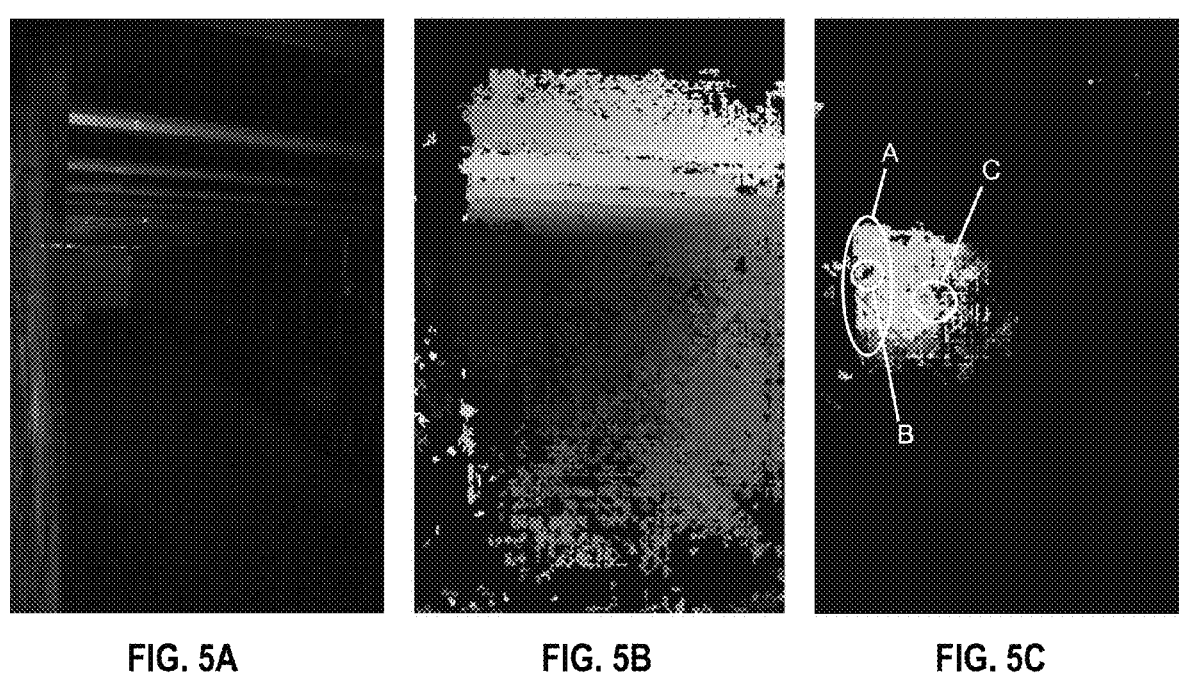
FIG. 5A is an image of the inside of a trailer taken with standard flood lighting.
FIG. 5B is a disparity map of generated using the image of FIG. 5A.
FIG. 5C is the disparity map of FIG. 5B with filtering applied.
Figures 5D, 5E, 5F:
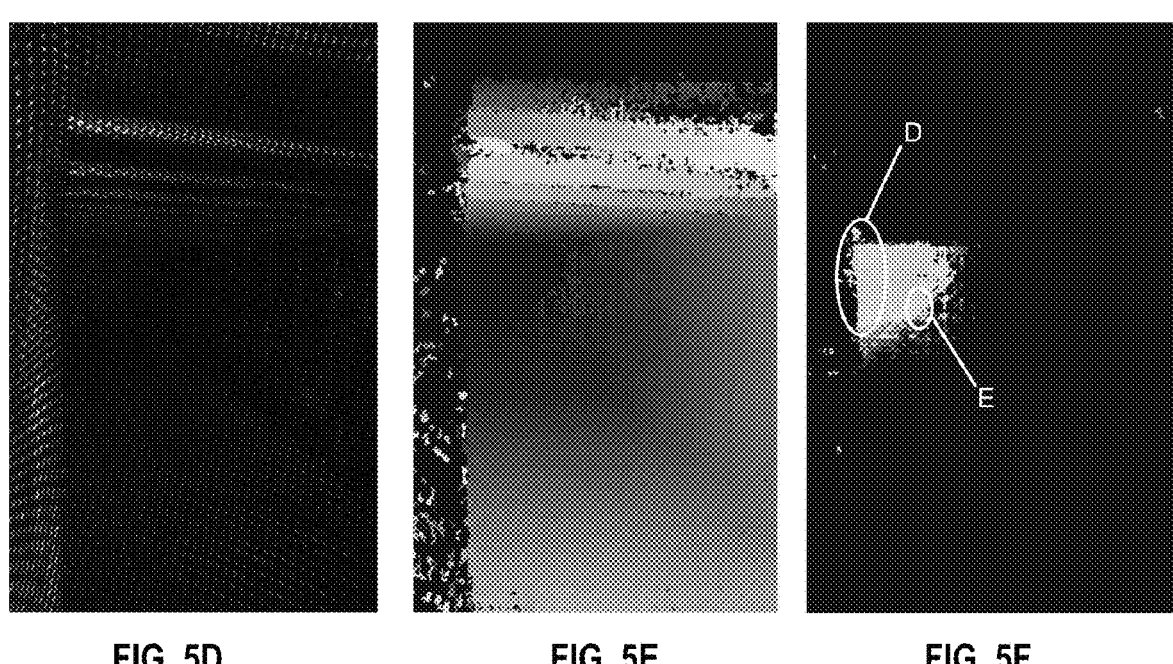
FIG. 5D is an image of the inside of the same trailer taken with structured lighting.
FIG. 5E is a disparity map generated using the image of FIG. 5D.
FIG. 5F is the disparity map of FIG. 5E with filtering applied.

FIGS. 5A-5D exemplify advantages of using structured light in embodiments of the present disclosure. FIG. 5A is an image of the interior of a trailer taken with a standard flood light shining in the trailer, FIG. 5B shows a disparity map calculated from the image shown in FIG. 5A, and FIG. 5C shows the disparity map of FIG. 5B with filtering applied. FIG. 5D is an image of the same trailer shown in FIG. 5A taken with structured light instead of standard flood lighting, FIG. 5E shows a disparity map calculated from the image shown in FIG. 5D, and FIG. 5F shows the disparity map of FIG. 5E with filtering applied. In the disparity maps, the range of colors represents disparity values, with dark blue indicating that there is no disparity data. Note that a column of boxes is present in the back left corner of the trailer.

It is clear from a comparison of FIG. 5B to FIG. 5E that using structured light results in a more complete disparity map. That is, more pixels with disparity data (i.e., non-dark blue pixels) are visible in the disparity map shown in FIG. 5E than in the disparity map shown in FIG. 5B. It is also clear from the comparison of FIG. 5B to FIG. 5E that using structured light results in a more accurate disparity map. That is, there are fewer incorrect pixels due to bad feature matches. This can be understood from the smooth gradient from high disparity value to low disparity value that is shown in FIG. 5E, which is expected since the depth of the points in the image smoothly transitions from low depth to high depth across the image.

A comparison of FIGS. 5C and 5F further demonstrates that using structured light results in a better disparity map. The disparity maps in FIGS. 5C and 5F were generated by filtering the disparity maps in FIGS. 5B and 5E so that only a small range of disparity values are allowed. As such, all values outside of depths corresponding to the allowed range of disparity values are not visible in the disparity maps in FIGS. 5C and 5F. And, thus, the colors mapped onto the disparity data are applied across a much smaller range of disparity values, making it easier to see differences. In the disparity map shown in FIG. 5C generated using standard flood lighting, the box column shown in Area A is not visible/messy. Further, in Area B there are gaps in the disparity data where the boxes are not visible (i.e., not enough texture). Still further, in Area C, there is a large amount of incorrect disparity data from bad feature matches. On the other hand, in the disparity map shown in FIG. 5F generated using structured light, the box column is visible in Area D with no gaps in the data. Further, there is less incorrect data from bad feature matches in Area E, with a smooth color gradient being visible, thereby indicating from far to near.

Referring again to FIG. 2, the mmWave device 208 operates to direct millimeter wavelength signals into the trailer or other type of enclosure and receive the signals reflected back from objects to the mmWave device 208. As will be understood by those skilled in the art, mmWave is a type of radar system that includes components designed to operate efficiently at frequencies of 30 GHz to 300 GHz. The components of a mmWave device include antennas, transceivers, and RF font-end modules, all of which are designed for high-speed signal transmission and reception. The mmWave device 208 may include phased array antennas and beamforming technology to direct signals efficiently, compensating for high propagation losses and improving link reliability. In some embodiments of the present disclosure, the mmWave device 208 includes one antenna for transmitting and three antennas for receiving the mmWave signals. But the present disclosure is not limited to such a mmWave device configuration and may have, for example, more than three antennas.

In embodiments of the present disclosure directed to monitoring enclosures for transporting cargo such as trailers, containers, and box trucks, the inclusion and use of a mmWave device reduces the amount of power needed to conduct the monitoring operations as compared to other types of monitoring systems that only use optical cameras, ultrasonic devices, or other monitoring devices. In comparison to optical cameras, a mmWave device operates with significantly lower power requirements while still providing reliable detection and tracking capabilities. Further, because mmWave devices do not rely on visible light, the devices can function effectively in low-light or visually obstructed environments, as often found in cargo enclosures, without the need for additional lighting or infrared illumination, thereby further reducing power usage. Compared to ultrasonic sensors, a mmWave device achieves efficient power consumption while maintaining reliable range and resolution, making it well-suited for monitoring a cargo enclosure. As will be explained in conjunction with the processes described below, the low power-consuming mm Wave device 200 of the monitoring system 200 may be used to monitor the interior of the trailer 100 until a specific time when the more power consuming optical camera system needs to be operated.

In embodiments of the present disclosure, the monitoring system 200 determines movement in the monitored space by processing the mmWave signals reflected back to the mmWave device 208. In detail, the at least one processor executing instructions stored in the at least one memory of the monitoring system 200 applies a fast Fourier transform (FFT) to convert the reflected mm Wave signals from the time domain to the frequency domain. This transformation enables the monitoring system 200 to distinguish between static and moving objects by examining the frequency components of the reflected mmWaves.

One factor in a mmWave analysis is a Doppler shift, which occurs when an object's movement alters the frequency of the reflected mmWave signals. If an object is moving toward or away from the mmWave device 208, the frequency shift is proportional to its velocity, allowing the monitoring system 208 to determine both the presence and speed of motion. If the FFT analysis detects only stationary reflections, meaning there is no significant Doppler shift in the received signals, the monitoring system 200 concludes that there is no movement in the monitored space. In this case, all detected objects in the monitored space are considered stationary. In other words, the mmWave signature of the interior of the trailer is static when there is no Doppler shift.

In embodiments of the present disclosure, the monitoring system 200 including the mmWave device 208 can be used to perform a method wherein imaging using a camera system, such as the stereo cameras 202A and 202B, is only performed when there is no movement detected in the space being monitored. Such a method may be useful in the field of monitoring cargo enclosures, as there may be a restriction on visual monitoring of workers loading or unloading the cargo. As the mmWave device 208 does not provide images of such workers, the monitoring system 200 may determine whether there is motion in the interior of cargo enclosure before engaging the cameras 202A and 202B. If the mmWave signature of the cargo enclosure is stable, meaning that no moving objects are detected, then the monitoring system 200 may engage the stereo cameras 202A and 202B to capture an image of the interior of the cargo enclosure. On the other hand, if movement is detected by the monitoring system 200 from mmWave signature, then the monitoring system 200 may delay the imaging by the cameras 202A and 202B. Thus, the cameras 202A and 202B will not take an image of workers loading or unloading cargo in the enclosure.

In addition to the detecting movement in a cargo enclosure, the mmWave device 208 in the monitoring system 200 also allows for determinations of whether cargo in the monitored enclosure has changed since a prior monitoring operation. The monitoring system 200 performs this function by using the mmWave device 208 to determine distances to stationary objects in the enclosure. In detail, the angle of arrival of the mmWaves reflected from the stationary objects at the multiple receiving antennas of the mmWave device 208 is measured based on phase differences between received signals, allowing the monitoring system 200 to estimate the direction of the incoming mmWaves. By using three or more receiving antennas of the mmWave device 208, which are in a known geometric arrangement, both azimuth (horizontal angle) and elevation (vertical angle) of the received signals can be determined, thereby enabling the determination of full three-dimensional positioning of objects in the trailer in spherical coordinates. Using known techniques, the spherical coordinates can then be translated into cartesian coordinates that are plotted on a coordinate representation of the interior of the monitored enclosure. And, thus, distances to the stationary objects are provided in the coordinate representation. It should be noted, however, that the present disclosure is not limited to any specific algorithm for determining distances to objects using mmWaves, but rather can use any available procedure to determine distances based on the mmWave signature.

By analyzing the mmWave signature, the monitoring system 200 can determine if there has been a change in objects in the enclosure being monitored, e.g., whether cargo has been added to or removed from a trailer. In this aspect of the present disclosure, the monitoring system 200 may determine a distance from the mmWave device 208 to a leading edge of the objects in the enclosure. The leading edge of the objects in this regard is a part of the objects that is closest to the mmWave device. The monitoring system 200 determines if there is a change in objects by comparing the distance from the mmWave device 208 to the leading edge of the objects to a previously determined distance from the mmWave device 200 to the leading edge of the objects in the monitored enclosure. The previous determination of distance to the objects in the interior of the trailer 100 may be stored in a memory of the monitoring system 200.

Figure 6A:
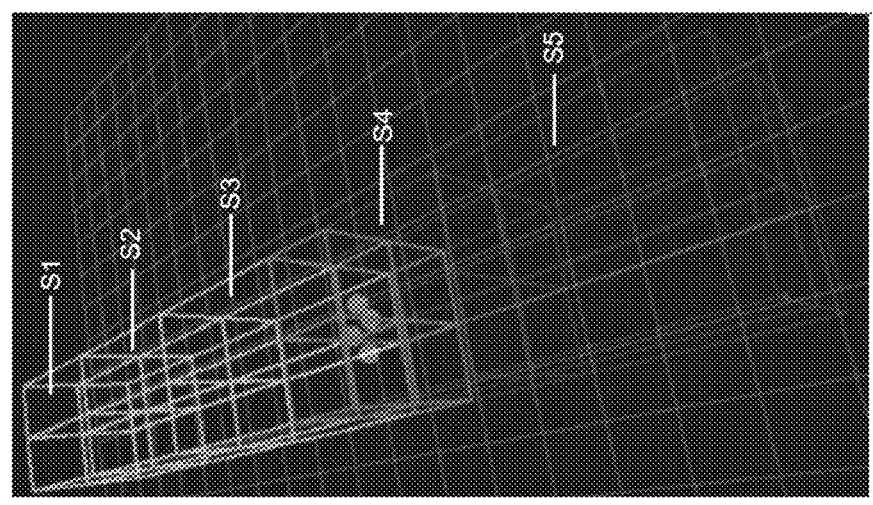
FIG. 6A is an image of the inside of a trailer.
Figure 6B:
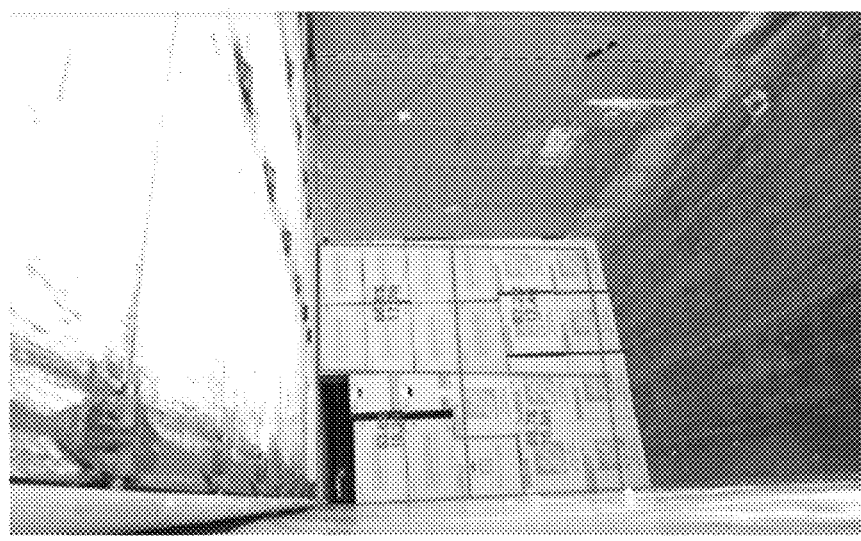
FIG. 6B is a representation of the inside of the trailer in the image of FIG. 6A including an indication of the contents inside the trailer as determined using a mmWave device.

In embodiments of the present disclosure, the enclosure being monitored is divided by the monitoring system 200 into a plurality of sections to facilitate the process of determining if there has been a change in objects. Such a procedure can be seen in FIGS. 6A and 6B. FIG. 6A is a picture of the interior of a trailer. FIG. 6B is a representation of the interior of the trailer as calculated by a monitoring system according to the present disclosure, with positioning of the cargo in the representation having been determined with use of the mmWave device of the monitoring system. In monitoring operations, the monitoring system 200 divides the trailer into sections. In the depicted embodiment, there are five sections S1-S5, but the present disclosure is not limited to any particular number of sections. In a monitoring operation, the monitoring system 200 determines from the mmWave signature which section the leading edge of the cargo is in. In the example depicted in FIG. 6B, the leading edge of the cargo is in section S4. This determination can be compared to determination in a previous monitoring operation of which section the leading edge is in. If the leading edge of the cargo was in a different section in the previous monitoring operation, then the monitoring system concludes that there may be a change in cargo, and, thus, the cameras 202A and 202B may be engaged for a more detailed determination of the contents of the trailer. On the other hand, if leading edge of the cargo is in the same section in the previous monitoring operation, then the monitoring system can conclude that there is no change in cargo and not engage the cameras 202A and 202B. In essence, the monitoring system makes a course determination from the mmWave signature if the contents of the trailer might have changed, and when there is a possible change, the monitoring system makes a higher-level determination of the contents using the camera system.

By determining if there has been a change in the objects in the interior of the enclosure being monitored, the power-consuming cameras 202A and 202B are not needlessly engaged. That is, if there is no change in objects in the enclosure, the monitoring system 200 may not capture an image of the interior of the enclosure, thereby saving the power required to operate the cameras 202A and 202B.

Figure 7:
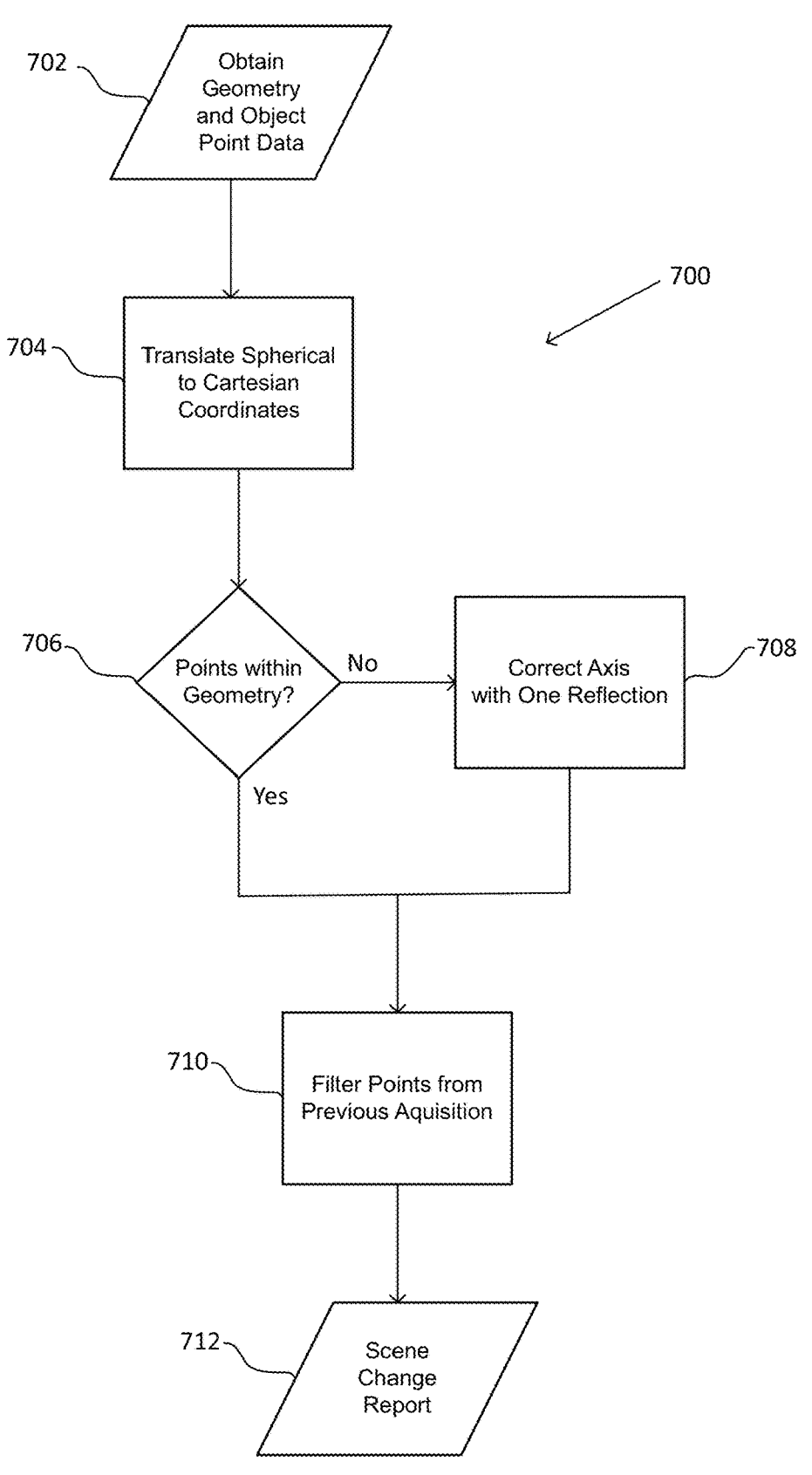
FIG. 7 is a flow chart of a process according to an embodiment of the present disclosure.

In further embodiments of the present disclosure, the at least one processor executing instructions stored in the at least one memory of the monitoring system 200 corrects points determined from the mmWave signature in a coordinate representation of the enclosure as part of the process of determining whether there has been a change in objects in the enclosure. A flowchart for this process is shown in FIG. 7. The processor of the monitoring system 200 obtains a cartesian coordinate representation of the geometry of the interior the enclosure. This coordinate representation may be stored in a memory of the monitoring system 200. In step 702, using the mmWave signature, the processor calculates points of objects. The calculated points may be in spherical coordinates, so in step 704 the spherical coordinates are translated to cartesian coordinates and then plotted in the coordinate representation of the geometry of the enclosure. Next, in step 706, the processor determines which of the calculated points are within the geometry of the interior of enclosure and which of the calculated points are outside the geometry of the interior of the enclosure. In step 708, the processor corrects the points that are calculated to be outside the geometry of the interior of the enclosure due to mmWave signals being reflected from surfaces of the enclosure by calculating a single reflection in the plane of the interior surface closest to the point. The processor then filters out points that remain outside of the geometry of the enclosure after the single reflection correction. In step 710 the processor compares the calculated points of one or more objects in the coordinate representation to a previous calculation of points of one or more objects in the coordinate representation to determine if there has been a change in the objects in the enclosure, and a final change report is produced in step 712. With this correction and filtering process, the monitoring system 200 more accurately determines the presence of objects in the enclosure and whether there has been a change in objects in the enclosure.

A mmWave device can be specifically configured to output signals tailored for a particular use case. In the context of monitoring the interior of a cargo enclosure, the mmWave device 208 may be configured to output chirps of the mmWave signals, with each chirp being a frequency modulated continuous wave having a frequency of 50 to 90 GHz and a bandwidth of 0.25 to 4.00 GHz. In more specific embodiments, the frequency modulated continuous wave signal has a frequency of 60 to 64 GHz and a bandwidth of 4 GHz. Each time the mmWave device is actuated by the processor of the monitoring system for a monitoring operation, the mmWave device may direct two chirps of the mmWave signals with less than 500 microseconds between the chirps. With such frequency, bandwidth, and timing characteristics, the mmWave device 208 outputs signals that enable detection of slow-moving objects (e.g., workers loading and unloading cargo) and sufficient resolution of objects to facilitate determinations if there has been a change in objects in the enclosure, and the power required for the mmWave device 208 is minimized.

Referring again to FIG. 2, the monitoring system 200 includes flood lights 204 for illuminating the interior of the trailer 100. The flood lights 204 could be used, for example, during loading or unloading of the trailer 100. The flood lights 204 may also be used in addition to, or as an alternative to, the structured light device 206 when imaging the interior of the trailer 200. In embodiments, the flood lights 204 are near-infrared light-emitting diodes (near-IR LEDs). One or more hoods 205 may be provided on the monitoring system 200 adjacent to the flood lights 204 to prevent the flood lights 204 from illuminating the sides of the trailer 100.

The further camera 210 is provided with the monitoring system 200 and is aimed in a different direction than the stereo cameras 202 A and 202 B. In particular, the further camera 210 may be directed at area of the trailer in the vicinity of the trailer doors. Thus, when desired, the camera 210 can be used to monitor the loading and unloading area of the trailer 100. In embodiments of the present disclosure, the camera 210 may be configured to take still images, video images, or both still and video images.

The monitoring system 200 may include additional components to enable and facilitate the monitoring operations and/or other operations of the system 200. In this regard, the monitoring system 200 may include one or more rechargeable batteries to provide power to the system. In further embodiments, the monitoring system 200 includes an accelerometer that can be used to determine when the trailer 100 is in motion or when the trailer 100 has stopped. The monitoring system 200 may further include communication systems, such as an internal BLUETOOTH® system. Those skilled in the art will recognize still further components that may be provided with a monitoring system as described herein.

In embodiments of the present disclosure, the monitoring system 200 determines whether the trailer door 104 is open or closed through the use of a magnetometer included in the monitoring system 200. The magnetometer is configured to measure the strength and direction of the magnetic field of the magnet 106 positioned on the trailer door 104 in the vicinity of the monitoring system 200. During installation of the monitoring system 200, the system can be calibrated to determine the strength and direction of the magnetic field when the door 104 is closed and the strength and direction of the magnetic field when the door 104 is open. These values are saved, e.g., in a memory of the monitoring system 200. Thus, the monitoring system 200 can thereafter determine the state of the door 104 based on the magnetic field strength and direction as measured by the magnetometer.

The use of the magnetometer in the monitoring system 200 provides several advantages over conventional door monitoring systems. For example, an ordinary, inexpensive magnet 106 may be used as the sensed component on the door 104. Further, because both the strength and direction of the magnetic field from the magnet 106 are detected by the magnetometer, the door detection system of the present disclosure is much harder to thwart by an intruder as compared to conventional systems where a simple presence or absence of a magnetic field is used in the determination of the state of the door. Still further advantages are the easy calibration of the door monitoring system, reduced maintenance costs of the system, and wide applicability of the door monitoring system, e.g., to both swinging and roll-up doors of enclosures.

It should be noted that the door monitoring aspects of the present disclosure may be provided independently of the other aspects of monitoring system described herein. That is, a system may be provided that includes only a magnetometer and a corresponding magnet connected to a door without the other monitoring functionalities, such as movement and object detection using a mmWave device and stereo imaging. The door monitoring aspects have broad applicability and uses. For example, the door monitoring aspects may be used in conjunction with doors in a variety of vehicles, buildings, etc.

A method 800 of monitoring a cargo enclosure according to an embodiment of the present disclosure will now be described with reference to FIG. 8. The method 800 may be performed using the monitoring system 200 as described above. While the method 800 is described in the context of monitoring a trailer that is transported by a vehicle, those skilled in the art will recognize that aspects of the method may be easily adapted for use in monitoring other types of cargo enclosures and for use in other monitoring situations.

The monitoring process in the method 800 begins when the door to the trailer (or other type of enclosure) is opened at step 810. As discussed above, whether the trailer door is open may be determined using the combination of a magnetometer in the monitoring system and a magnet mounted to the trailer door in the vicinity of the monitoring system, with the monitoring system thereby determining whether the door is open based on the strength and direction of the magnetic field of the magnet. However, in other embodiments, other types of door monitoring mechanisms may be used by the monitoring system to determine the state of the trailer door.

When the monitoring system detects that the door is opened, the sensing operations with the mmWave device begins at step 820. In this step, the monitoring system determines whether the scene in the monitored space is stable. That is, when monitoring a trailer, the monitoring system determines from the mmWave signature of the interior of the trailer whether there are any moving objects in the trailer. If moving objects are detected, then in step 830 the monitoring operation is delayed for a set time before repeating step 820 to determine if the interior of the trailer has become stable.

When the monitoring system determines at step 280 that the scene is stable and there are no moving objects in the trailer, then step 840 of the method is performed to determine if the scene has changed in the time since a previous monitoring operation. In the context of monitoring a trailer, the monitoring system determines from the mmWave signature whether there has been a change of objects in the trailer. As discussed above, this determination may be made based on the distance from the mmWave device to a leading edge of the objects. As further discussed above, a change in objects can be determined from a comparison to a previous determination of objects in the trailer. The step 840 can include filtering of points to account for reflections off the walls of the trailer, as discussed above.

When it is determined that there is a change in objects in the trailer, the step 850 may be performed to obtain an optical image of the interior of the trailer. In this step, the stereo cameras may be used to capture stereo images that allow for calculations related to the contents of the trailer, such as volume of objects and the percentage of occupied floor space. Also in this step, structured lighting can be directed from the monitoring system into the interior of the trailer to improve the captured stereo images, and the stereo images may be further enhanced using the techniques described above. However, it should be noted that in other embodiments, other types of optical imaging may be performed in step 850, such as an image being taken of the interior of the trailer with a single camera, or such as a video recording being taken of the interior of the trailer.

After the stereo images are obtained in step 850, in step 860 the monitoring system performs analysis related to the occupancy of the trailer. As discussed above, a depth map may be created from stereo images taken by the cameras of the monitoring system, and the monitoring system may calculate the percentage of the interior of the trailer that is occupied, the percentage of occupied floor space, etc. The calculations and/or the image taken of the interior of the trailer may be transmitted from the monitoring system, for example, using the operatively connected antenna mounted on the roof of the trailer (or other type of enclosure).

Referring again to step 840, the method 800 may also include a step 870 of determining whether a set amount of time has passed since the last imaging of the monitored space. In other words, the monitoring system determines whether a previously taken image of the interior of the trailer has "expired." If the set time has passed, then the method proceeds to step 850 even if no scene change is detected in step 840.

Figure 8:
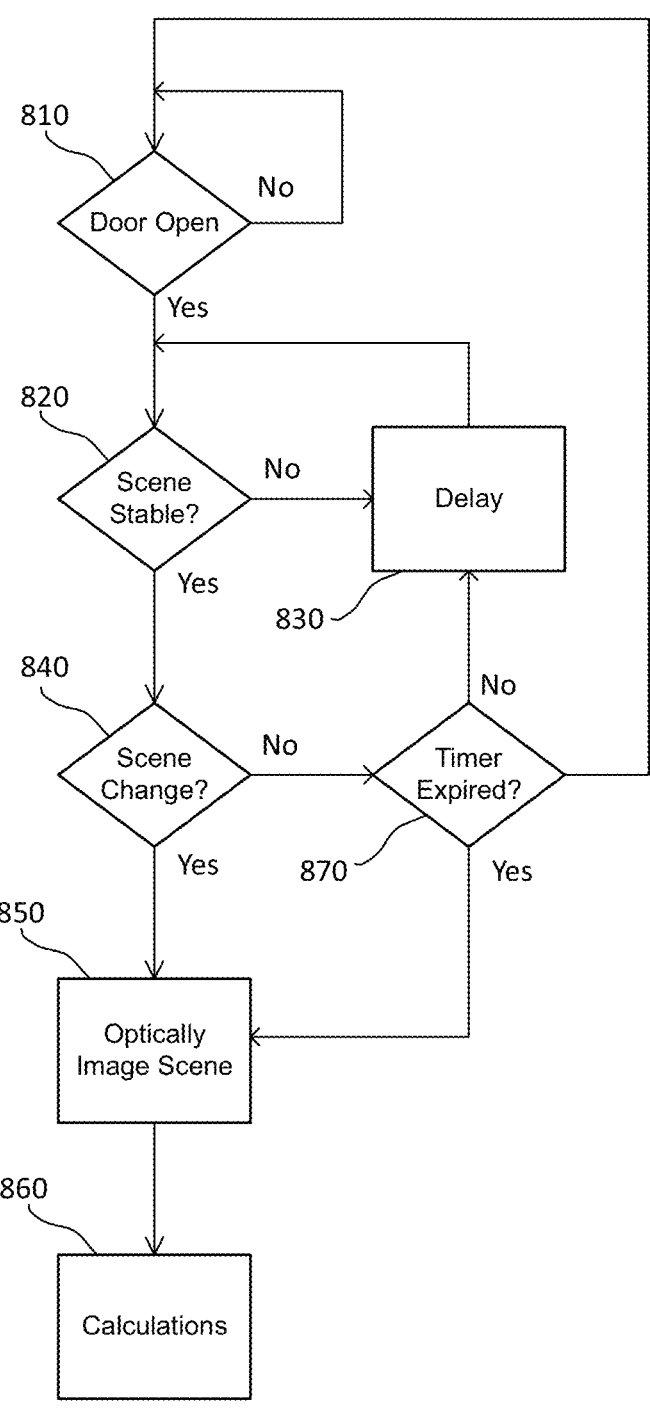
FIG. 8 is a flow chart of another process according to an embodiment of the present disclosure.

While the method depicted in FIG. 8 and described above has been described as a series of sequential steps, other methods according to the present disclosure are not necessarily limited to the described order of the steps or the inclusion of all of the steps. For example, separately described steps in the above-described method may be performed simultaneously or in a different order. As another example, the step 850 may entail capturing a still or video image of the monitored space and not stereo imaging, with the subsequent calculation step 860 being omitted.

Figure 9:
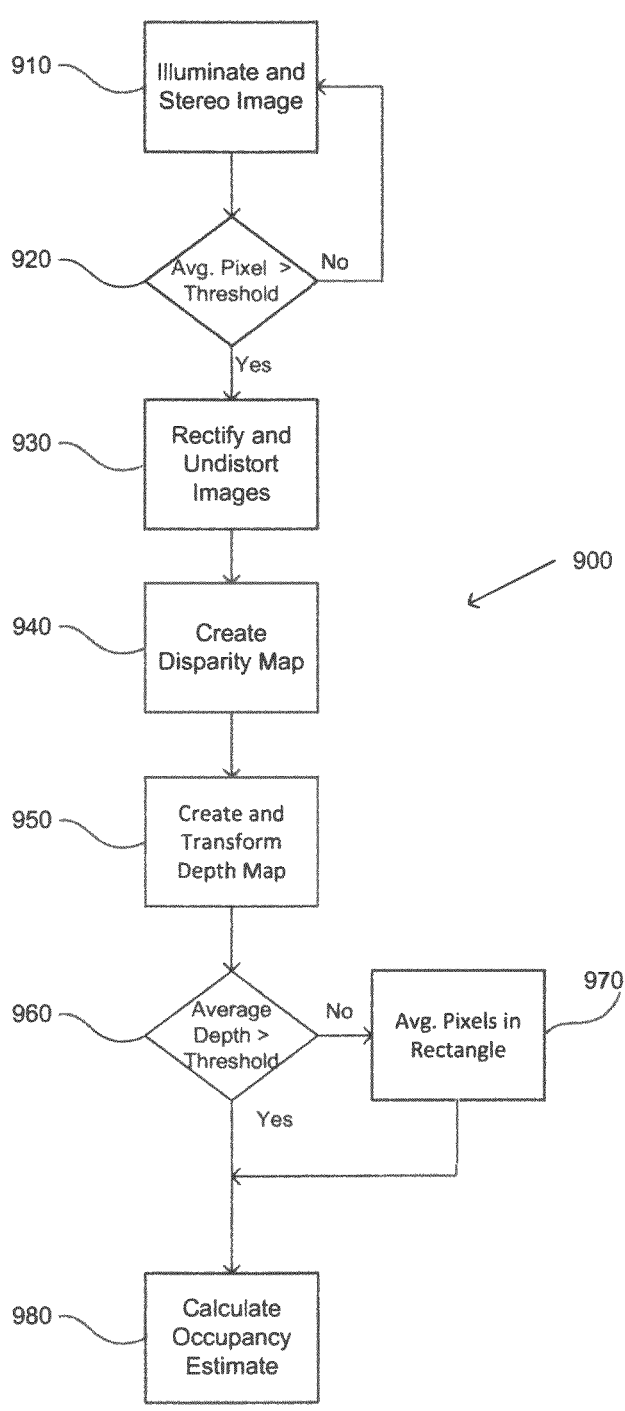
FIG. 9 is a flow chart of another process according to an embodiment of the present disclosure.

FIG. 9 is a flow chart of a method 900 of calculating an occupancy estimate of a cargo enclosure according to an embodiment of the present disclosure. The method 900 may be performed using a monitoring system as described above, including cameras configured to capture stereo images of the cargo enclosure and a structured light device configured to direct structured light into the cargo enclosure.

The method 900 begins with a step 910 of illuminating the interior of the cargo enclosure with structured light and the cameras capturing one or more stereo images according to well-lit settings.

Next, in step 920, average pixel values of the stereo images are determined. Based on the average values, a determination is made as to whether to use low-light exposure time and the camera's image sensor gain settings. If the average pixel value is below a threshold, new stereo images are captured by the cameras using low-light settings.

In step 930, the stereo images are rectified and undistorted using calibration values stored in the memory of the monitoring system. In step 940 a disparity map is created using, for example, semi-global block matching, as described above. The disparity map may be rotated for easier readability such that the top of the image corresponds to the ceiling of the cargo enclosure.

In step 950, a depth map is created from the disparity map by reprojecting the image to 3D coordinates using calibrated values stored in the memory of the monitoring system. A perspective transform is then executed on the depth map, which realigns the X, Y, Z values from the cameras' coordinate system that is tilted with respect to the cargo enclosure to a coordinate system that is aligned with the cargo enclosure.

Next, in step 960, an average depth measurement calculated in a rectangle of pixels in the scene representing the dimensions of the wall at the end (e.g., nose) of the cargo enclosure. If the average depth measurement exceeds a threshold of, for example, 20%, 40%, 60%, or 80% of the distance between the wall at the end of the cargo enclosure and the entrance to the cargo enclosure, in step 970 depth values of pixels are averaged in a rectangle representing a slice of the cargo enclosure, with this slice being a larger rectangle that is parallel to the wall at the end of the cargo enclosure but at the exceeded distance threshold.

Finally, at step 980, the average depth is subtracted from the length of the cargo enclosure, and the result is divided by the length of the cargo enclosure to obtain an occupancy estimate of objects in the cargo enclosure. Thus, the method 900 provides an analysis that is highly useful, e.g., for monitoring a shipping process. Of course, those skilled in the art will recognize variations of this method and other methods that can be used to monitor a cargo enclosure with the systems described herein.

Further embodiments of the present disclosure are directed to a non-transitory computer-readable storage medium that stores instructions for a processor to carry out the above-described methods. More specifically, further embodiments of the present disclosure are directed to a non-transitory computer-readable storage medium that stores instructions that can be executed by the processor of a monitoring system to perform the aspects of the monitoring operations as described herein.

With aspects of the present disclosure, monitoring systems and monitoring methods are provided for monitoring a cargo enclosure or other type of enclosed space. The systems and methods provide numerous advantages over prior art monitoring systems and monitoring methods, such as reduced power consumption, adaptability for monitoring a dark environment such as the interior of a trailer, and flexibility to only monitor during certain circumstances, such as when there is no movement in the interior of a trailer and/or when there is a change in contents of the trailer. Those skilled in the art will recognize numerous other advantages of the monitoring systems and methods beyond those expressly described herein.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure. For example, unless otherwise indicated, various components and steps may be omitted, substituted, or arranged in a configuration other than the example embodiments discussed above.

The invention claimed is:

1. A system for monitoring an enclosure that is transported by a vehicle, the system comprising:

a mmWave device configured to direct mmWave signals into the enclosure and receive mm Wave signals reflected back to the mmWave device;

at least one camera configured to capture an image of an interior of the enclosure; and at least one processor configured to read out and execute instructions stored in at least one memory to perform a monitoring operation wherein the at least one processor (i) processes the mmWave signals that are reflected back and received by the mmWave device to determine if there is a moving object in the interior of the enclosure and (ii) directs the at least one camera to capture the image of the interior of the enclosure when it is determined that there is no moving object in the interior of the enclosure, wherein, in the monitoring operation, the at least one processor (i) determines a distance from the mm Wave device to one or more objects in the interior of the enclosure, (ii) determines if there is a change in one or more objects in the interior of the enclosure by comparing the distance from the mm Wave device to the one or more objects in the interior of the enclosure to a previously determined distance from the mmWave device to one or more objects in the interior of the enclosure, and (iii) directs the at least one camera to capture the image of the interior of the enclosure when it is determined that there is no movement in the interior of the enclosure and that there has been a change in one or more objects in the interior of the enclosure, and wherein, when determining the distance from the mmWave device to one or more objects in the interior of the enclosure, the processor (i) obtains a coordinate representation of a geometry of the interior of the enclosure, (ii) calculates points corresponding to one or more objects in the coordinate representation, (iii) corrects points corresponding to the one or more objects in the coordinate representation to be inside the geometry of the interior of the enclosure that are initially calculated to be outside the geometry of the interior of the enclosure due to mmWave signals reflected from surfaces of the interior of the enclosure, (iv) filters out points that remain outside of the geometry of the interior of the enclosure after the correction, (iv) compares the calculated points of one or more objects in the coordinate representation to a previous calculation of points of one or more objects in the coordinate representation to determine if there has been a change in distance from the mm Wave device to the one or more objects in the interior of the enclosure.

2. The system according to claim 1, wherein, when determining the distance from the mmWave device to one or more objects in the interior of the enclosure, the processor (i) divides the interior of the enclosure into a plurality of sections and makes a coarse determination using the mm Wave device of whether one or more objects are present in each section, and (ii) makes a detail determination of the one or more objects in the sections where one or more of the objects are determined to be present.

3. The system according to claim 1, wherein the at least one camera includes two cameras configured to capture stereo images of the interior of the enclosure, and wherein, in the monitoring operation, the at least one processor creates a depth map of the interior of the enclosure from the stereo images and determines a volume of objects in the interior of the enclosure from the depth map.

4. The system according to claim 3, further comprising a structured light device configured to project structured light into the interior of the enclosure, wherein, in the monitoring operation, the at least one processor directs the structured light device to project the structured light into the interior of the enclosure when the cameras capture the stereo images of the interior of the enclosure.

5. The system according to claim 1, wherein the mmWave device is configured to output chirps of the mmWave signals, with each chirp being a frequency modulated continuous wave having a frequency of 50 to 90 GHz and a bandwidth of 0.25 to 4.00 GHz.

6. The system according to claim 5, wherein the frequency modulated continuous wave signal has a frequency of 60 to 64 GHz and a bandwidth of 4.00 GHz.

7. The system according to claim 1, wherein, in the monitoring operation, the mmWave device directs two chirps of the mmWave signals with less than 500 microseconds between the chirps.

8. The system according to claim 1, wherein the mmWave device includes at least three antennas.

9. The system according to claim 1, further comprising a communication device configured to transmit data from the system, wherein, in the monitoring operation, the at least one processor directs data generated after operation of the at least one of the mmWave device and the at least one camera to the communication device, and the communication device transmits the data.

10. A system for monitoring an enclosure that is transported by a vehicle, the system comprising:

a mmWave device configured to direct mmWave signals into the enclosure and receive mmWave signals reflected back to the mmWave device;

at least one camera configured to capture an image of an interior of the enclosure; and at least one processor configured to read out and execute instructions stored in at least one memory to perform a monitoring operation wherein the at least one processor (i) processes the mmWave signals that are reflected back and received by the mm Wave device to determine if there is a moving object in the interior of the enclosure and (ii) directs the at least one camera to capture the image of the interior of the enclosure when it is determined that there is no moving object in the interior of the enclosure, wherein, in the monitoring operation, the mmWave device directs two chirps of the mmWave signals with less than 500 microseconds between the chirps.

11. The system according to claim 10, wherein, in the monitoring operation, the at least one processor (i) determines a distance from the mmWave device to one or more objects in the interior of the enclosure, (ii) determines if there is a change in one or more objects in the interior of the enclosure by comparing the distance from the mmWave device to the one or more objects in the interior of the enclosure to a previously determined distance from the mmWave device to one or more objects in the interior of the enclosure, and (iii) directs the at least one camera to capture the image of the interior of the enclosure when it is determined that there is no movement in the interior of the enclosure and that there has been a change in one or more objects in the interior of the enclosure.

12. The system according to claim 10, wherein, when determining the distance from the mmWave device to one or more objects in the interior of the enclosure, the processor (i) divides the interior of the enclosure into a plurality of sections and makes a coarse determination using the mmWave device of whether one or more objects are present in each section, and (ii) makes a detail determination of the one or more objects in the sections where one or more of the objects are determined to be present.

13. The system according to claim 10, wherein the at least one camera includes two cameras configured to capture stereo images of the interior of the enclosure, and wherein, in the monitoring operation, the at least one processor creates a depth map of the interior of the enclosure from the stereo images and determines a volume of objects in the interior of the enclosure from the depth map.

14. The system according to claim 13, further comprising a structured light device configured to project structured light into the interior of the enclosure, wherein, in the monitoring operation, the at least one processor directs the structured light device to project the structured light into the interior of the enclosure when the cameras capture the stereo images of the interior of the enclosure.

15. The system according to claim 10, wherein the mmWave device is configured to output chirps of the mmWave signals, with each chirp being a frequency modulated continuous wave having a frequency of 50 to 90 GHz and a bandwidth of 0.25 to 4.00 GHz.

16. The system according to claim 15, wherein the frequency modulated continuous wave signal has a frequency of 60 to 64 GHz and a bandwidth of 4.00 GHz.

17. The system according to claim 10, wherein the mm Wave device includes at least three antennas.

18. The system according to claim 10, further comprising a communication device configured to transmit data from the system, wherein, in the monitoring operation, the at least one processor directs data generated after operation of the at least one of the mmWave device and the at least one camera to the communication device, and the communication device transmits the data.

* * * * *